United States Patent
Nguyen

(10) Patent No.: US 8,553,375 B2
(45) Date of Patent: Oct. 8, 2013

(54) INTELLIGENT SOFT START CONTROL TO REDUCE ELECTROSTATIC DISCHARGE CLAMP CURRENT SPIKES

(75) Inventor: Don J. Nguyen, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 780 days.

(21) Appl. No.: 12/752,189

(22) Filed: Apr. 1, 2010

(65) Prior Publication Data

US 2011/0241570 A1     Oct. 6, 2011

(51) Int. Cl.
     *H02H 9/00*      (2006.01)
(52) U.S. Cl.
     USPC ............................................. 361/18; 361/56
(58) Field of Classification Search
     USPC ............................................. 361/18, 56, 111
     See application file for complete search history.

(56) References Cited

U.S. PATENT DOCUMENTS

| | | | | |
|---|---|---|---|---|
| 7,088,078 B2 * | 8/2006 | Liu | ............................... | 323/207 |
| 7,518,846 B1 * | 4/2009 | Meyer | ............................. | 361/56 |
| 8,063,622 B2 * | 11/2011 | Kung et al. | .................. | 323/288 |
| 2008/0136341 A1 * | 6/2008 | Araki et al. | ............... | 315/209 R |
| 2011/0006694 A9 * | 1/2011 | Tamegai et al. | ........... | 315/209 R |

\* cited by examiner

*Primary Examiner* — Danny Nguyen
(74) *Attorney, Agent, or Firm* — Jordan IP Law, LLC

(57) ABSTRACT

Systems and methods of regulating a power supply may involve ramping an output voltage of the power supply toward an operating voltage level at a first slew rate in response to detecting a soft start condition of the power supply. A determination can be made as to whether the output voltage has exceeded an intermediate voltage level and, if so, the output voltage may be ramped toward the operating voltage level at a second slew rate. The first slew rate can be substantially less than the second slew rate in order to prevent an electrostatic discharge pump from activating.

14 Claims, 4 Drawing Sheets

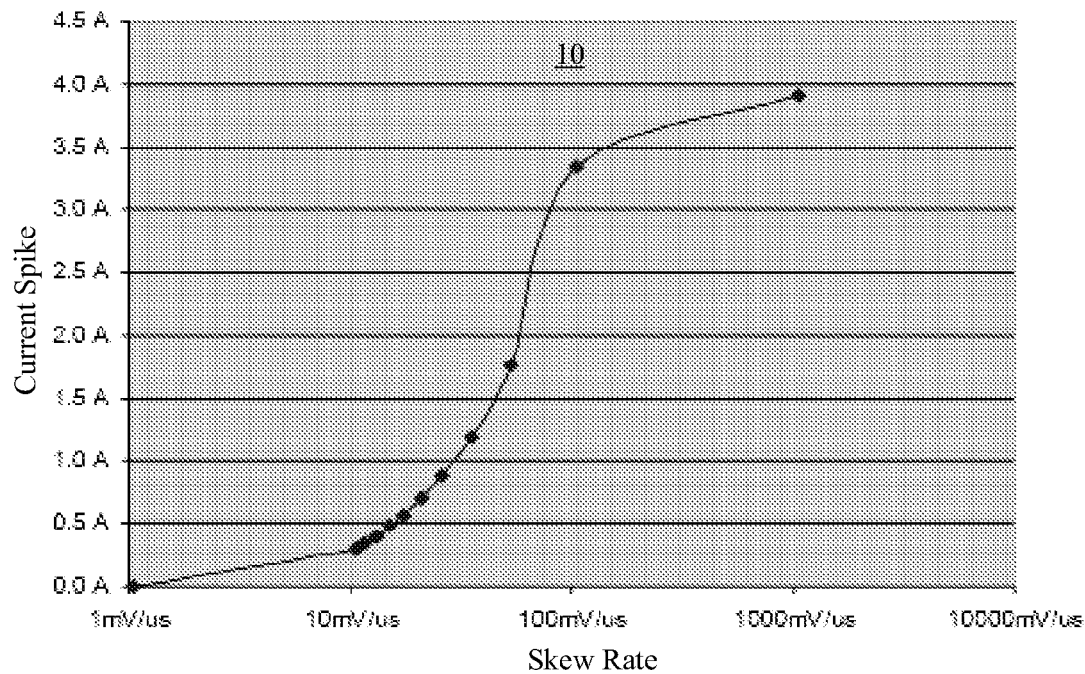
FIG. 1
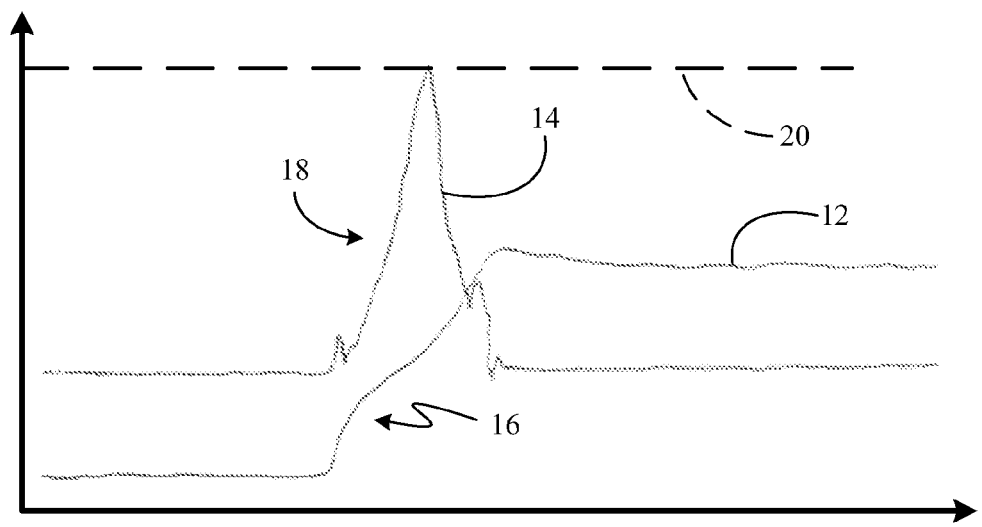
FIG. 2A --PRIOR ART--

INTELLIGENT SOFT START CONTROL TO REDUCE ELECTROSTATIC DISCHARGE CLAMP CURRENT SPIKES

BACKGROUND

1. Technical Field

Embodiments generally relate to the regulation of soft start power supplies. In particular, embodiments relate to the use of multiple output voltage slew rates to improve power supply operation.

2. Discussion

Mobile devices may have small form factors and lightweight considerations that call for small batteries with low capacity and low current delivery capability. As such, mobile devices may frequently power their power supplies off and on to manage power consumption. To minimize circuit wait time and performance degradations that might result from this power cycling, the voltage regulators of the power supplies may be designed to have relatively fast output voltage slew rates. The integrated circuits coupled to these power supplies, however, may include internal electrostatic discharge (ESD) clamps that are designed to quickly turn on to protect internal circuitries. When subjected to fast ramping supply outputs, the ESD clamps may therefore activate and cause a large current spike at the output of the power supply. If the current spike is larger than the maximum output loading condition, the voltage regulators may enter an over-current mode and shut down the system.

BRIEF DESCRIPTION OF THE DRAWINGS

The various advantages of the embodiments of the present invention will become apparent to one skilled in the art by reading the following specification and appended claims, and by referencing the following drawings, in which:

FIG. 1 is plot of an example of an ESD clamp current spike versus output voltage slew rate according to an embodiment;

FIG. 2A is a plot of an example of output voltage and current curves for a conventional solution;

DETAILED DESCRIPTION

Figure 2B:
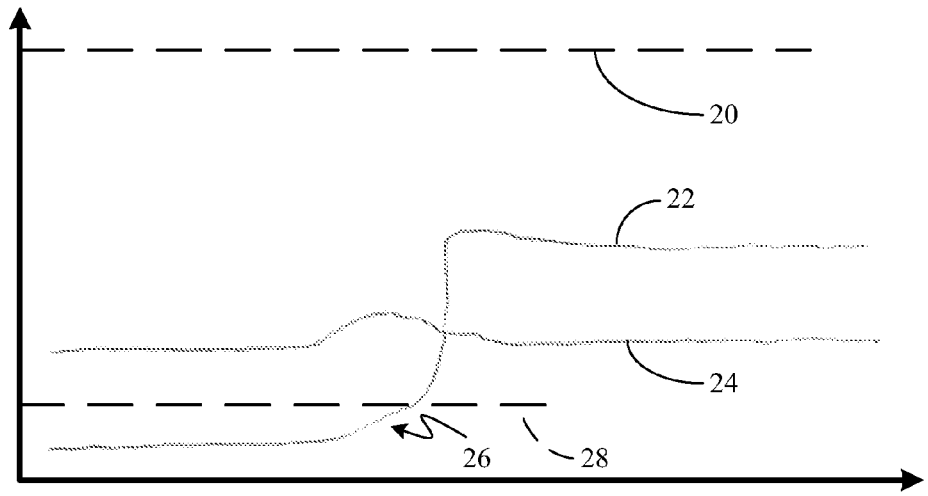
FIG. 2B is a plot of an example of output voltage and current curves according to an embodiment.

Embodiments may provide for a method of operating a power supply in which an output voltage of the power supply is ramped toward an operating voltage level at a first slew rate in response to detecting a soft start condition of the power supply. A determination can be made as to whether the output voltage has exceeded an intermediate voltage level. If the output voltage has exceeded the intermediate voltage level, the output voltage may be ramped toward the operating voltage level at a second slew rate. The first slew rate may be less than the second slew rate in order to prevent activation of an electrostatic discharge clamp.

Embodiments may also provide for an apparatus having a power supply and a soft start module to ramp an output voltage of the power supply toward an operating voltage level at a first slew rate in response to detecting a soft start condition of the power supply. The apparatus can also include a monitoring module to determine whether an output voltage of the power supply has exceeded an intermediate voltage level. If the output voltage has exceeded the intermediate voltage level, the soft start module may ramp the output voltage of the power supply toward the operating voltage level at a second slew rate.

Other embodiments can include a system having an integrated circuit, an electrostatic discharge clamp coupled to the integrated circuit, and a power supply coupled to the integrated circuit. The system may also include a soft start module to ramp an output voltage of the power supply toward an operating voltage level at a first slew rate in response to detecting a soft start condition of the power supply. A monitoring module can determine whether an output voltage of the power supply has exceeded an intermediate voltage level. If so, the soft start module can ramp the output voltage of the power supply toward the operating voltage level at a second slew rate.

FIG. 1 shows an example of a curve 10 demonstrating the behavior of an electrostatic discharge (ESD) clamp such as a single thin-gate PMOS (p-type metal oxide semiconductor) clamp, which could be used to provide protection for an integrated circuit that operates on an output voltage provided by a power supply. Table 1 below shows the corresponding rise times and current spikes for a range of output voltage slew rates for curve 10.

TABLE 1

| Rise Time | Output Voltage Slew Rate | Current Spike |
| --- | --- | --- |
| 1 μs | 1050 mV/μs | 3.920 A |
| 10 μs | 105 mV/μs | 3.340 A |
| 20 μs | 53 mV/μs | 1.760 A |
| 30 μs | 35 mV/μs | 1.190 A |
| 40 μs | 26 mV/μs | 0.892 A |
| 50 μs | 21 mV/μs | 0.703 A |
| 60 μs | 18 mV/μs | 0.575 A |
| 70 μs | 15 mV/μs | 0.480 A |
| 80 μs | 13 mV/μs | 0.410 A |
| 90 μs | 12 mV/μs | 0.355 A |
| 100 μs | 11 mV/μs | 0.300 A |
| 1000 μs | 1 mV/μs | 0.003 A |

In the illustrated curve 10 and Table 1, the clamp's current increases substantially if the slew rate of the power supply is between approximately 20 mV/μs and 100 mV/μs. The specific values provided herein are used to facilitate discussion only, and may vary depending upon the specific circumstances and operating environment. Notwithstanding, in the illustrated example, significant current spikes may be experienced when a power supply with a relatively high output voltage slew rate is used. Accordingly, devices such as mobile devices could particularly experience performance degradations.

FIG. 2A shows an output voltage curve 12 and a corresponding current curve 14 for an ESD clamp that can be used to protect an integrated circuit supplied by a conventional power supply. In the illustrated example, the voltage curve 12 has a relatively steep slope (e.g., high slew rate) in a region 16 just after a soft start condition is initiated. The high slew rate of region 16 can cause a corresponding spike (e.g., high inrush current) in the current curve 14 at region 18. When the illustrated current curve 14 exceeds an over-current threshold 20, a system shutdown may occur. The shutdown might also be triggered by an appropriate over-voltage condition depending upon the circuit design.

Turning now to FIG. 2B, an output voltage curve 22 and a corresponding current curve 24 are shown for an ESD clamp that may be used to protect an integrated circuit supplied by an enhanced power supply. In the illustrated example, the voltage curve 22 has a relatively shallow slope (e.g., low slew rate) in a region 26 just after a short start condition is detected. The portion of the current curve 24 corresponding to the region 26 may be associated with the amount of current needed to charge the output capacitor of the power supply and may be more spread out than the similar portion of the conventional current curve 14 (FIG. 2A). Once the illustrated voltage curve 22 exceeds an intermediate voltage level 28, the slew rate can be increased without concern of the ESD clamp activating. Thus, the illustrated approach is able to reach the steady state operating voltage level quickly while preventing system shutdown. In addition, the illustrated approach may obviate any need to modify the ESD clamp, which could be costly and time consuming.

Figure 3:
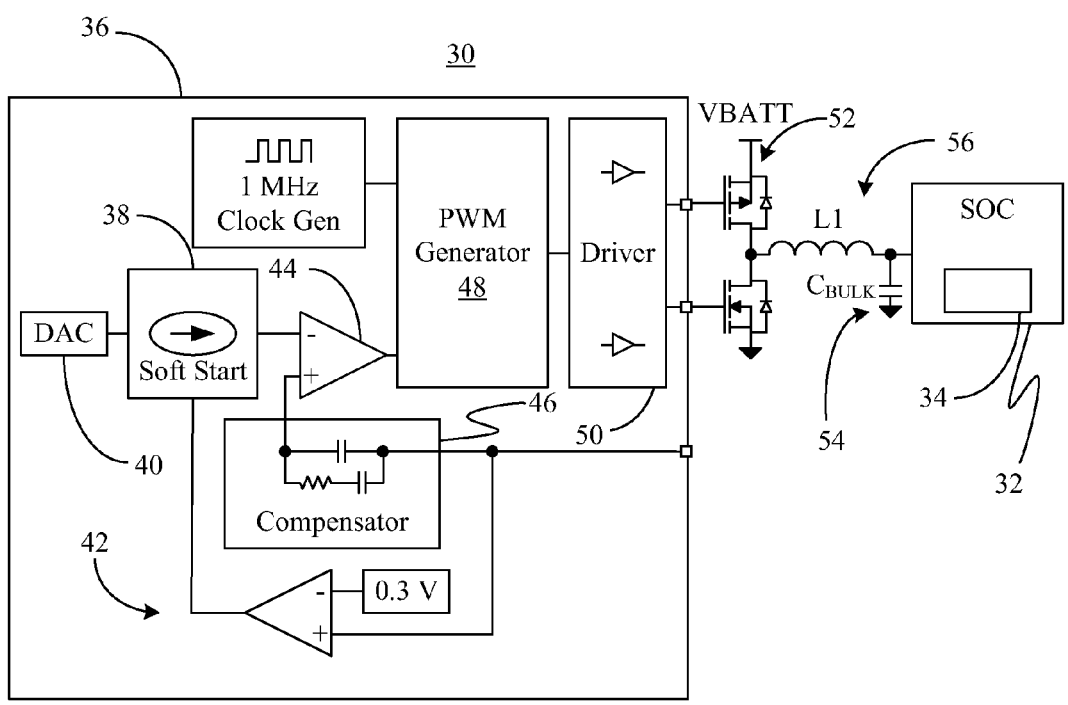
FIG. 3 is a block diagram of an example of a dual slew rate architecture according to an embodiment.

FIG. 3 shows one example of a particular implementation in system 30. In the illustrated example, the system 30 includes an integrated circuit such as a system-on-chip (SOC) 32 having an ESD clamp 34. The system 30 may also include a power supply 36 such as a step-down switched mode power supply (SMPS) that converts a battery voltage (VBATT) to an output voltage (VOUT). In the illustrated example, the power supply 36 has a soft start module 38 that ramps the output voltage of the power supply 36 toward the operating voltage level at a first slew rate in response to detecting a soft start condition from a digital to analog converter (DAC) 40. Initiating the soft start condition might involve receiving a command from the DAC 40 to turn on the power supply 36 (e.g., in response to the user pressing a power on button of the device). A comparator 44 may be coupled to the output of the soft start module 38 as well as the output of a compensator 46, which can receive and process the output voltage. A pulse width modulated (PWM) generator 48 can use the output of the comparator 44 and a clock signal to provide a duty signal to a driver circuit 50 that may be used to operate switches 52 so that an output capacitor 54 is charged through an inductor (L1) 56 and the desired operating voltage level is provided to the SOC 32.

A monitoring module 42 may determine whether the output voltage of the power supply 36 has exceeded an intermediate voltage level 28 (FIG. 2B). In the illustrated example, the monitoring module 42 includes a comparator and the intermediate voltage level is 0.3 V, wherein the operating voltage level might be 1 V. Other monitoring configurations and voltage levels may also be used. If the output voltage has exceeded the intermediate voltage level, the soft start module 38 can ramp the output voltage toward the operating voltage level at a second slew rate. As already noted, the first slew rate may be substantially less than the second slew rate in order to prevent the ESD clamp 34 from activating and causing a system shutdown. The slew rates may be programmable or fixed depending upon the circumstances.

Figure 4:
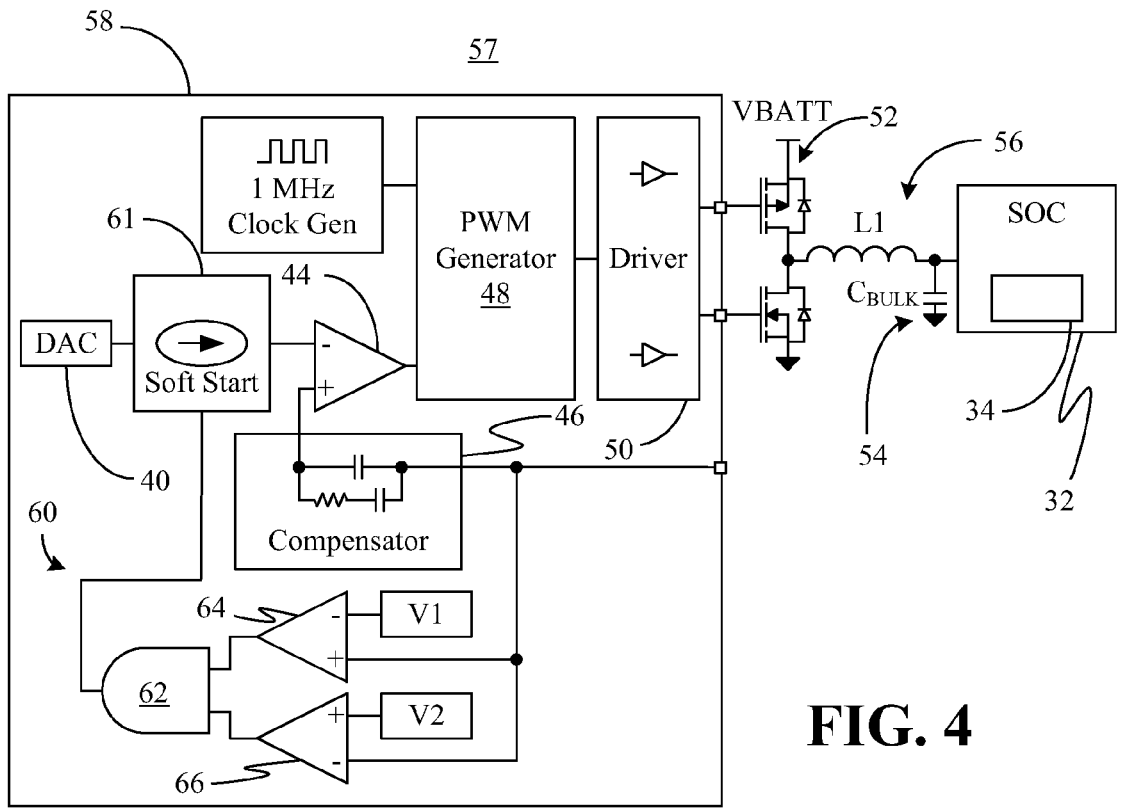
FIG. 4 is a block diagram of an example of a windowed slew rate architecture according to an embodiment.

Turning now to FIG. 4, an alternative embodiment is shown in which a slow ramp window is established. In general, a system 57 has a power supply 58 that is able to detect a soft start condition and ramp the output voltage toward the operating voltage level quickly (e.g., first slew rate) until the output capacitor 54 is charged, slowly (e.g., second slew rate) until the ESD clamp activation voltage level is surpassed, and quickly (e.g., third slew rate) thereafter. Thus, a monitoring module 60 may also include an AND gate that receives input from a first comparator 64 that compares the output voltage to a first intermediate voltage level (V1), and a second comparator 66 that compares the output voltage to a second intermediate voltage level (V2). If the output voltage is between the first and second intermediate voltage levels (e.g., within the window defined by V1 and V2), a soft start module 61 can ramp the output voltage at a slew rate that is low enough to prevent activation of the ESD clamp 34. The illustrated example therefore effectively establishes a third slew rate, wherein the second slew rate is less than the first and third slew rates and the second slew rate prevents the ESD clamp 34 from activating. In addition, the first slew rate may be selected to that it is just enough to charge the output capacitor 54.

Figure 5:
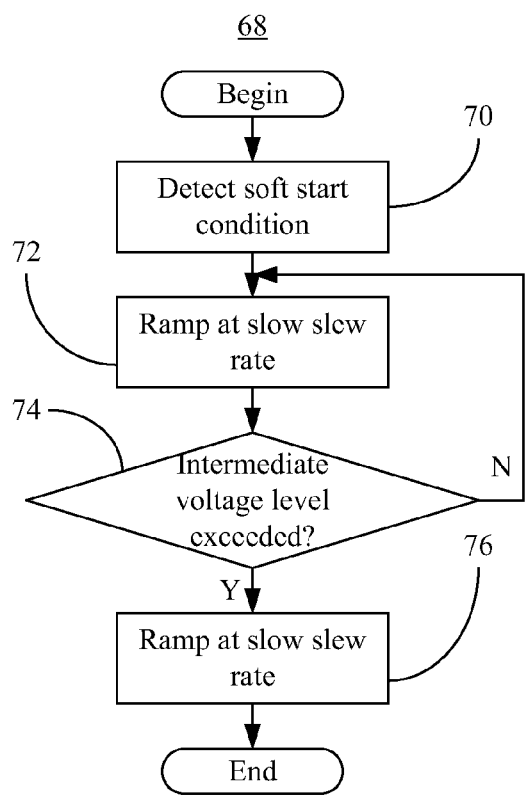
FIG. 5 is a flowchart of an example of a method of regulating a power supply according to an embodiment.

FIG. 5 shows a method 68 of regulating a power supply. The method 68 may be implemented in fixed-functionality hardware using circuit technology such as application specific integrated circuit (ASIC), complementary metal oxide semiconductor (CMOS) or transistor-transistor logic (TTL) technology, in executable software as a set of logic instructions stored in a machine- or computer-readable storage medium such as random access memory (RAM), read only memory (ROM), programmable ROM (PROM), firmware, flash memory, etc., or any combination thereof. Illustrated processing block 70 provides or detecting a soft start condition of a power supply. As already noted, the soft start condition might be associated with a user pressing an on button of a mobile device containing the power supply, wherein an associated command is received to regulate the power supply at a certain operating voltage level.

The output voltage of the power supply may be ramped toward the operating voltage level at a first slew rate at block 72. Block 74 provides for determining whether the output voltage has exceeded an intermediate voltage level. If so, the output voltage of the power supply may be ramped toward the operating voltage level at a second slew rate at block 76. As already noted, establishing a relatively low value for the first slew rate can prevent high inrush currents and erroneous system shutdowns that might occur as a result of the high inrush currents. As also already noted, the method 68 could also ramp the output voltage at a third slew rate if the output voltage has exceeded a second intermediate voltage level in order to obtain a windowed slew rate solution. Indeed, the windowing concept might be expanded to provide for multiple windows based on the operation of other components in the architecture.

Figure 6:
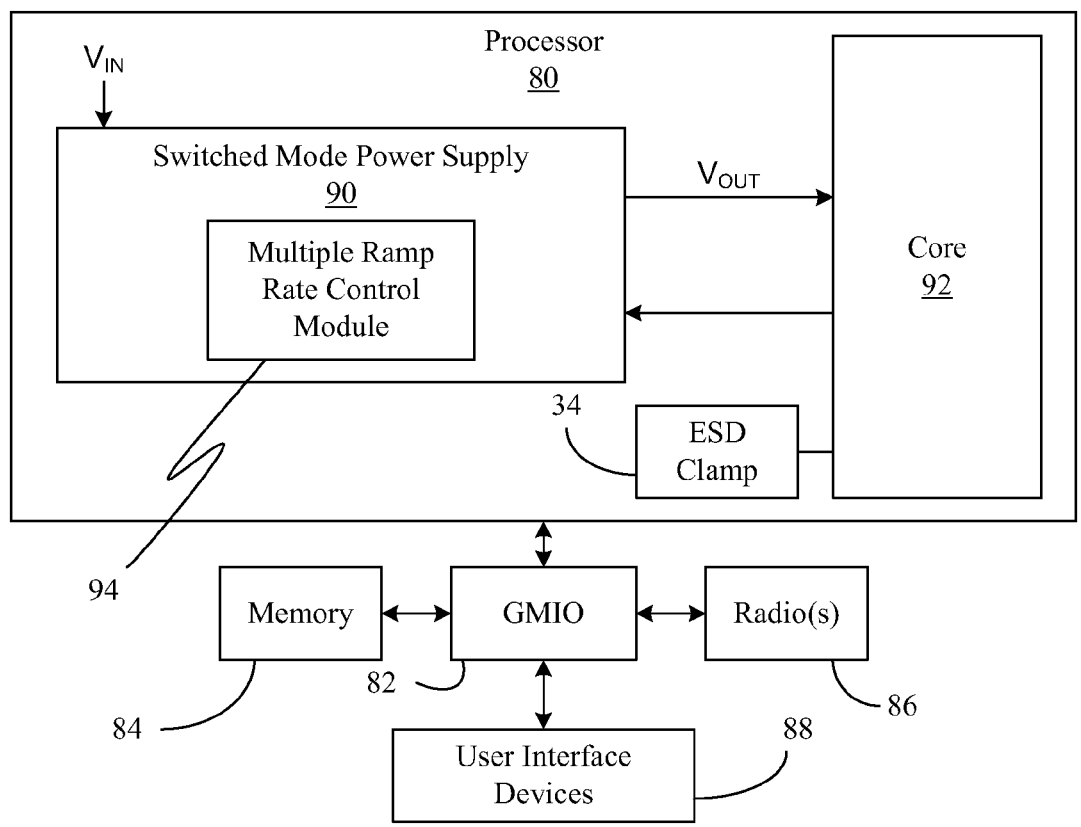
FIG. 6 is a block diagram of an example of a system according to an embodiment.

FIG. 6 shows a mobile platform 78 such as a laptop, personal digital assistant (PDA), wireless smart phone, media player, imaging device, mobile Internet device (MID), etc., or any combination thereof. The illustrated platform 78 includes one or more processors 80, a graphics/memory/input/output (GMIO) control 82, memory 84, a wireless interface/radio 86, and user interface devices 88. The illustrated processor 80 functions as an SOC that includes a switched mode power supply 90, and a processor core 92. The processor 80 could also have a multi-core configuration. A DC input voltage signal/level/potential $V_{IN}$ might be obtained from a battery (not shown) or other rail source that is not directly usable by the processor core 92. Thus, the power supply 90 may convert the input voltage signal into a DC output voltage signal level/potential $V_{OUT}$, which the processor core 92 can use during operation to perform various computing tasks.

The illustrated processor power supply 90 includes a multiple ramp rate control module 94 that may include functionality such as that shown in soft start and monitoring modules 38, 42 (FIG. 3), or soft start and monitoring modules 61, 60 (FIG. 4), already discussed, in order to prevent an ESD clamp 92 from effectively shutting down the system.

The processor 80 may be coupled to the memory 84, radios 86, and user interface devices 88 through the GMIO control 82. The GMIO control 82 may include one or more blocks (e.g., chips or units within an integrated circuit) to perform various interface control functions (e.g., memory control, graphics control, I/O interface control, and the like). These circuits may be implemented on one or more separate chips and/or may be partially or wholly implemented within the processor 80.

The memory 84 can include one or more memory blocks to provide additional RAM to the processor 80. It may be implemented with any suitable memory including but not limited to dynamic RAM (DRAM), static RAM (SRAM), flash memory, or the like. The radios 86 may wirelessly couple the processor 80 to a wireless network (not shown). The user interface devices 88 may include one or more devices such as a display, keypad, mouse, etc. to allow a user to interact with and perceive information from the platform 78. The multiple ramp rate control module 94 might also be used to prevent erroneous activation of integrated circuits within the GMIO control 82, memory 84, radios 86 and/or user interface devices 88. Such functionality could be accomplished via the illustrated power supply 90 or by incorporating the multiple ramp rate control module 94 into other power supplies of the platform 78.

As already noted, the platform 78 may implement a variety of different computing devices or other appliances with computing capability. Such devices include but are not limited to mobile and fixed computing systems. The platform 78 could constitute one or more complete computing systems or alternatively, it could constitute one or more components useful within a computing system.

Embodiments described herein are applicable for use with all types of semiconductor integrated circuit ("IC") chips. Examples of these IC chips include but are not limited to processors, controllers, chipset components, programmable logic arrays (PLA), memory chips, network chips, and the like. In addition, in some of the drawings, signal conductor lines are represented with lines. Some may be thicker, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments of the present invention are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments of the invention. Further, arrangements may be shown in block diagram form in order to avoid obscuring embodiments of the invention, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments of the invention, it should be apparent to one skilled in the art that embodiments of the invention can be practiced without, or with variation of, these specific details. The description is thus to be regarded as illustrative instead of limiting.

The term "coupled" is used herein to refer to any type of relationship, direct or indirect, between the components in question, and may apply to electrical, mechanical, fluid, optical, electromagnetic, electromechanical or other connections. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

I claim:

1. A method comprising:
   ramping an output voltage of a power supply toward an operating voltage level at a first slew rate in response to detecting a soft start condition of the power supply;
   determining whether the output voltage has exceeded an intermediate voltage level; and
   ramping the output voltage of the power supply toward the operating voltage at a second slew rate if the output voltage has exceeded the intermediate voltage level; and
   wherein:
     the first slew rate is less than the second slew rate; and
     ramping the output voltage at the first slew rate prevents an electrostatic discharge clamp of an integrated circuit coupled to the power supply from activating.

2. The method of claim 1, further including:
   determining whether the output voltage has exceeded a second intermediate voltage level; and
   ramping the output voltage at a third slew rate if the output voltage has exceeded the second intermediate voltage level, wherein the second slew rate is less than the first and third slew rates.

3. The method of claim 2, wherein ramping the output voltage at the second slew rate prevents an electrostatic discharge clamp of an integrated circuit coupled to the power supply from activating.

4. The method of claim 2, wherein ramping the output voltage at the first slew rate charges an output capacitor coupled to the power supply.

5. The method of claim 1, wherein the power supply is a step-down switched mode power supply.

6. An apparatus comprising:
   a soft start module to ramp an output voltage of a power supply toward an operating voltage level at a first slew rate in response to a soft start condition of the power supply; and
   a monitoring module to determine whether an output voltage of the power supply has exceeded an intermediate voltage level, the soft start module to ramp the output voltage of the power supply toward the operating voltage level at a second slew rate if the output voltage has exceeded the intermediate voltage level; and
   wherein:
     wherein the first slew rate is to be less than the second slew rate; and the soft start module is to ramp the output voltage at the first slew rate to prevent an electrostatic discharge clamp of an integrated circuit coupled to the power supply from activating.

7. The apparatus of claim 6, wherein the monitoring module is to determine whether the output voltage has exceeded a second intermediate voltage level, and the soft start module is to ramp the output voltage at a third slew rate if the output voltage has exceeded the second intermediate voltage level, wherein the second slew rate is to be less than the first and third slew rates.

8. The apparatus of claim 7, wherein the soft start module is to ramp the output voltage at the second slew rate to prevent an electrostatic discharge clamp of an integrated circuit coupled to the power supply from activating.

9. The apparatus of claim 7, wherein the soft start module is to ramp the output voltage at the first slew rate to charge an output capacitor coupled to the power supply.

10. The apparatus of claim 6, wherein the power supply is a step-down switched mode power supply.

11. A system comprising:
    an integrated circuit having an electrostatic discharge clamp;
    a power supply coupled to the integrated circuit, the power supply including,
    a soft start module to ramp an output voltage of the power supply toward an operating voltage level at a first slew rate in response to a soft start condition of the power supply, and
    a monitoring module to determine whether an output voltage of the power supply has exceeded an intermediate voltage level, the soft start module to ramp the output voltage of the power supply toward the operating voltage level at a second slew rate if the output voltage has exceeded the intermediate voltage level; and
    wherein:
        the first slew rate is to be less than the second slew rate; and
        the soft start module is to ramp the output voltage at the first slew rate to prevent the electrostatic discharge clamp from activating.

12. The system of claim 11, wherein the monitoring module is to determine whether the output voltage has exceeded a second intermediate voltage level, and the soft start module is to ramp the output voltage at a third slew rate if the output voltage has exceeded the second intermediate voltage level, wherein the second slew rate is to be less than the first and third slew rates.

13. The system of claim 12, wherein the soft start module is to ramp the output voltage at the second slew rate to prevent the electrostatic discharge clamp from activating.

14. The system of claim 12, further including an output capacitor coupled to the power supply, wherein the soft start module is to ramp the output voltage at the first slew rate to charge the output capacitor.

* * * * *

UNITED STATES PATENT AND TRADEMARK OFFICE
CERTIFICATE OF CORRECTION

| | | |
|---|---|---|
| PATENT NO. | : 8,553,375 B2 | Page 1 of 1 |
| APPLICATION NO. | : 12/752189 | |
| DATED | : October 8, 2013 | |
| INVENTOR(S) | : Don J. Nguyen | |

It is certified that error appears in the above-identified patent and that said Letters Patent is hereby corrected as shown below:

In the Drawings

On sheet 3 of 4, in Figure 5, Reference Numeral 72, line 1, delete "slcw" and insert -- slew --, therefor.

On sheet 3 of 4, in Figure 5, Reference Numeral 74, line 3, delete "excccdcd?" and insert -- exceeded? --, therefor.

Signed and Sealed this
Fourth Day of March, 2014

Michelle K. Lee
*Deputy Director of the United States Patent and Trademark Office*